United States Patent
Takamura et al.

(10) Patent No.: US 6,174,070 B1
(45) Date of Patent: Jan. 16, 2001

(54) PORTABLE LIGHTING INSTRUMENT HAVING A LIGHT EMITTING DIODE ASSEMBLY

(75) Inventors: Katsutoshi Takamura, Sakura; Katsumi Yamada, Sagamihara; Masao Hikita, Mitaka, all of (JP)

(73) Assignees: Elna Kabushiki Kaisha, Kanagawa-ken; Elna Components Kabushiki Kaisha, Tokyo, both of (JP)

( * ) Notice: Under 35 U.S.C. 154(b), the term of this patent shall be extended for 0 days.

(21) Appl. No.: 09/260,576

(22) Filed: Mar. 1, 1999

(30) Foreign Application Priority Data

Mar. 2, 1998 (JP) .................................................. 10-066191
Dec. 10, 1998 (JP) .................................................. 10-351535

(51) Int. Cl.$^7$ ........................................................ F21L 4/00
(52) U.S. Cl. .......................... 362/183; 362/470; 340/946
(58) Field of Search ................................... 362/183, 470, 362/157; 340/946, 953, 954

(56) References Cited

U.S. PATENT DOCUMENTS 6,060,658 * 5/2000 Yoshida et al. ................... 362/183 X
6,069,557 * 5/2000 Anglin, Jr. et al. ............. 340/953 X

* cited by examiner

Primary Examiner—Stephen Husar
(74) Attorney, Agent, or Firm—Jordan and Hamburg LLP

(57) ABSTRACT

A portable lighting instrument having a light emitting diode assembly capable of being applied to a lighting system for a helicopter taking off and landing place. The system is constituted by a lighting instrument including a heliport lighthouse installed in a fixed position temporarily determined as a temporary taking off and landing place for a helicopter, a wind lamp, a landing area lighting lamp, a boundary guide lamp, and a boundary lamp. For at least the boundary guide lamp and the boundary lamp out of these lighting instruments, the portable lighting instrument according to the present invention can be used. The lighting instrument comprises a casing; a solar cell disposed on the outer surface of the casing; an electrical double-layer capacitor placed in the casing and charged by the solar cell; and a light emitting diode assembly disposed on the top of the casing and lighted by a current supplied from the electrical double-layer capacitor.

17 Claims, 8 Drawing Sheets

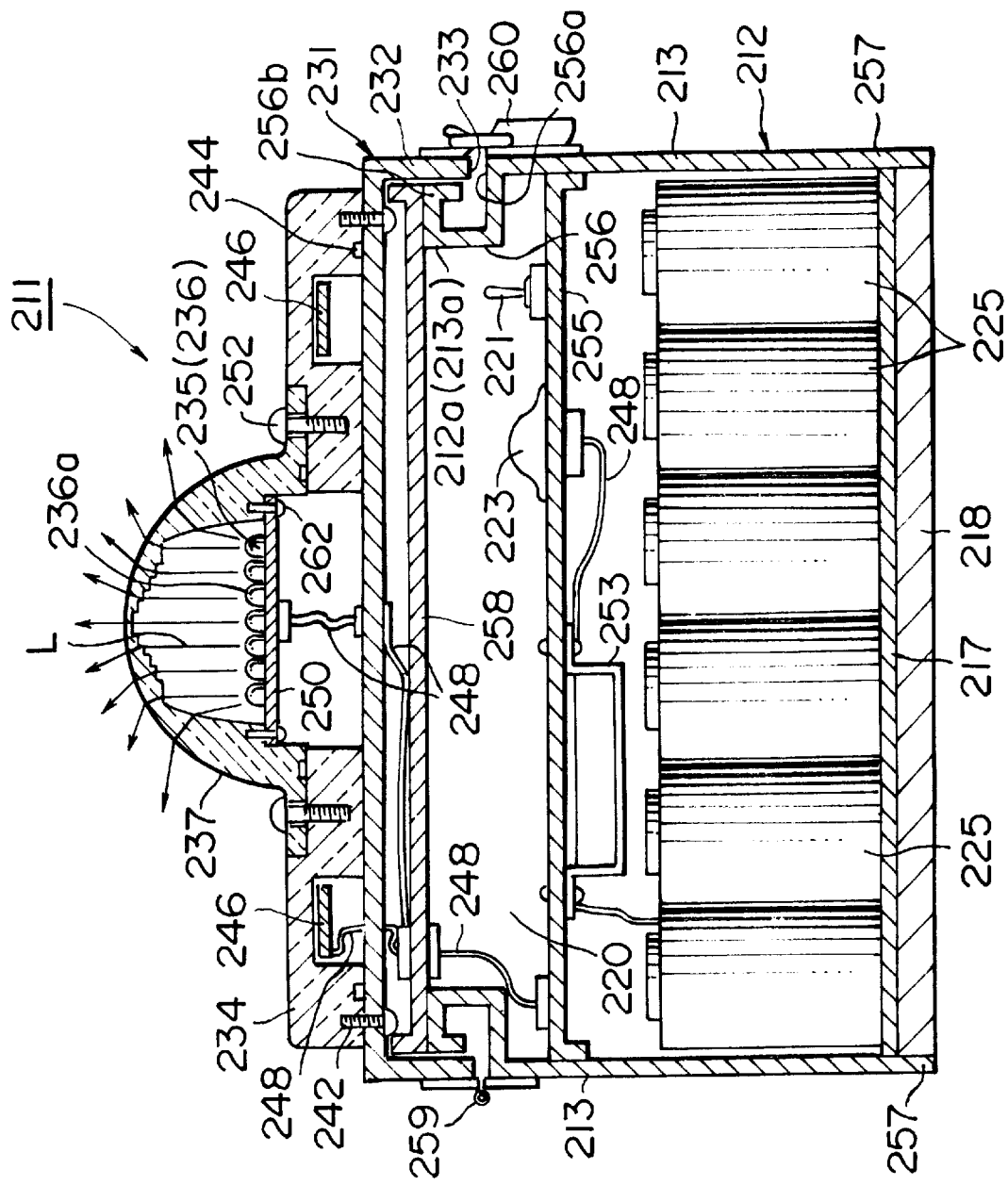

PORTABLE LIGHTING INSTRUMENT HAVING A LIGHT EMITTING DIODE ASSEMBLY

FIELD AND BACKGROUND OF THE INVENTION

The present invention relates to a portable lighting instrument suitable for use, in taking off and landing of a helicopter on a temporary heliport safely at night at the urgent time or the like, with emergency "a boundary lamp" or "a boundary guide lamp" in the heliport.

In the place for taking off and landing of a helicopter, there are some kinds and natures determined under laws and ordinances, which are represented by a name peculiar thereto. However, the respective places are obliged to provide a lighting system necessary in taking off and landing of a helicopter. For example, it is necessary for places called "an urgent taking off and landing place" and "an urgent rescue space" to install at least "a heliport lighthouse" whose light is an alternate flash of white or an alternate flash of white and green, "a wind lamp" whose light is white, "a boundary guide lamp" whose light is green, and "a boundary lamp" whose light is white or yellow. Further, in "a taking off and landing place outside an airport, it is requested to install various kinds of lighting instruments in accordance with "an urgent taking off and landing place" or "an urgent rescue space" according to the using object on all such occasions.

The above-described various kinds of lighting instruments presently used include lamps such as a xenon lamp, a halogen lamp and the like, and these lamps are fixedly mounted in a fixed position. In order that lighting and lighting-out may be controlled by manually operating a control unit available nearby or operating a control unit placed in a remote center, the lighting instruments are connected with the control unit by necessary wiring. Installing operation accompanied by wiring is cumbersome, and obviously there lacks in conformity at the time of emergency.

Recently, there has been proposed a lighting system for a helicopter taking off and landing place in which with respect to the "a heliport lighthouse", "a wind lamp" and "a landing area lighting lamp", a generator with a lamp such as a halogen lamp is separately installed, and with respect to the "a boundary lamp" and "a boundary guide lamp", a lamp with a charging type battery is installed to thereby eliminate the necessity of a wiring. However, since a lamp of large consuming power is involved, a generator and a battery having a large capacity are necessary, and as a result, cost for apparatuses increases. Further, since noises and exhaust gases are generated when the engine is operated in addition to the cumbersome that the engine of a generator should be started and prepared in advance, there has posed a problem of exerting an unfavorable effect on the peripheral environment. In the case of a charging type lamp, since long charging time for 6 to 8 hours is necessary, precharging is necessary, and the lighting time also ought to be relatively short. A secondary battery such as a lead battery is used, and when the battery is left for a long period of time, it becomes naturally discharged not to obtain necessary and sufficient voltage, which is therefore possibly be useless at the time of emergency. Even if an attempt is made to use the battery again after discharge, it takes a long time for charging, and there lacks in conformity.

An attempt of using a light emitting diode as a light source for general lighting has been made so far, but application thereof to a lighting system for a helicopter taking off and landing has not yet been succeeded.

SUMMARY OF THE INVENTION

An object of the present invention is to provide a portable lighting instrument which can be carried anywhere, and particularly to a portable lighting instrument which can be suitably used in assisting that a helicopter which mobilizes for rescue activity at the time of urgent accidents can be taken off and landed safely even at night.

A portable lighting instrument according to the present invention is characterized by comprising a box body provided with a chargeable electrical double-layer capacitor, and a lid for covering an opening of the box body, the lid comprising a light source comprising a light emitting diode assembly lighted by a current supplied from the electrical double-layer capacitor, and a lens body for covering the light source and controlling the diffusion range of irradiation light in a direction of an optical axis.

Since the electrical double-layer capacitor is low in internal resistance, rapid charging is possible, and a discharge output at a high ampere level is obtained. There is a merit that there are many chargeable and dischargeable times, and the constituent material contains no public hazardous substances such as lead, Ni—Cd and so on. For example, when use is made of a group consisting of 36 electrical double-layer capacitors whose single characteristic is 2.5 V, 100 F, and 250 coulombs, the group of capacitors are fully charged in a few minutes (a rapid charging mode) by normal batteries mounted on an automobile.

On the other hand, it is known that in the light emitting diode, a relatively large quantity of light is obtained in spite of a very small consuming power. In the present invention, however, 25 light emitting diode assemblies can be used which has a brightness of approximately 4,000 mcd per one, and has a rate of 20 mA with 2.2 V or 2.3 V. In this case, preferably, each light emitting diode is of a wide angle shape having an irradiation angle of about 30 degrees.

The lighting instrument according to the present invention can be applied to a lighting system for a helicopter taking off and landing place. This system is constituted by a light instrument including a heliport lighthouse, a wind lamp, a landing area lighting lamp, a boundary guide lamp, and a boundary lamp. The portable lighting instrument according to the present invention can be used for at least the boundary guide lamp and the boundary lamp out these lighting instruments. In this case, preferably, a solar cell module is provided in addition to the above-described constitution. That is, there are provided a portable casing, a solar cell module disposed on the outer surface of the casing, an electrical double-layer capacitor placed within the casing and charged by the solar cell, and a light emitting diode assembly disposed on the top of the casing and lighted by a current supplied from the electrical double-layer capacitor. The casing is constituted by a box body provided with the electrical double-layer capacitor and a lid for covering an opening of the box body, the light emitting diode assembly being supported on the lid. The lid is also provided with a lens body for covering the light emitting diode assembly and controlling the diffusion range of irradiation light in a direction of an optical axis thereof.

The solar cell module(s) is constituted in the shape of a plurality of, for example, four solar panel connected in series, each panel having a voltage of 4.5 V and a current of 114 mA, and outputting a power of 18 V, 114 mA as a whole. The capacity of the electrical double-layer capacitor can be charged about 1 F by the output of 1 mA of the solar cell.

In the case where 36 electrical double-layer capacitors and 25 LED assemblies are combined, lighting for about 2 hours is possible at the time of full charge as a general standard. The laws and ordinances in this field stimulate that the lighting instrument is lighted at least 10 minutes before the landing scheduled time and being kept lighted for at least 5 minutes after taking off. However, in case of urgent taking off and landing, since the staying time is short, the lighting instrument according to the present invention can be applied to the lighting system for helicopter taking off and landing place.

BRIEF DESCRIPTION OF THE DRAWINGS

FIG. 7 is a schematic longitudinal sectional view showing a modification of the portable lighting instrument according to FIG. 4 similarly to FIG. 5.

DESCRIPTION OF THE PREFERRED EMBODIMENTS

Figure 1:
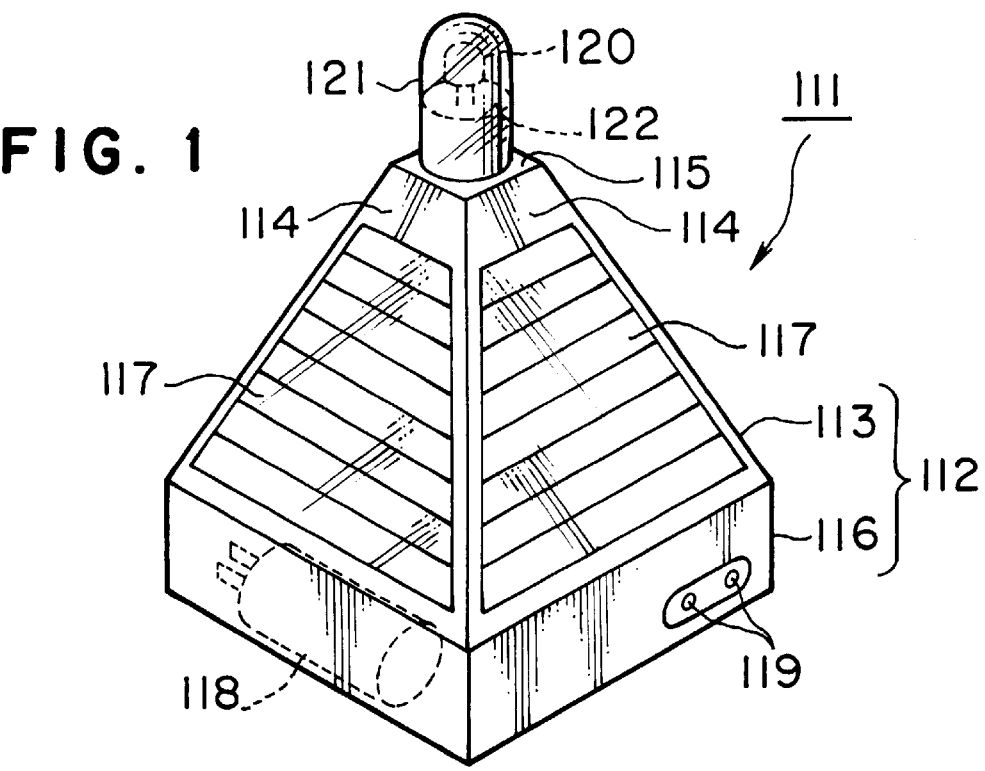
FIG. 1 is a general perspective view showing a portable lighting instrument according to the present invention.

Referring to FIG. 1, a portable lighting instrument comprises at least solar cell modules 117 disposed on the outer surface of a casing 112, a plurality of electrical double-layer capacitors 118 encased in the casing 112 and charged by the solar cells 117, and a light emitting diode assembly 120 disposed on the top of the casing and lighted by a current supplied from the electrical double-layer capacitors 118. The casing 112 is provided in its respective surfaces with oblique plate portions 114 inclined at a fixed angle with respect to a horizontal surface, and has a top plate portion 115 on the top thereof, the casing 112 being formed by a body portion 113 in the shape of a pyramid, for example, such as a frustum, and a base portion 116 in the form of a bed under the body portion 113. The solar cell modules 117 are disposed as solar panels so as to cover the outer surfaces of the oblique plate portions 14 in the casing body portion 113. The plurality of electrical double-layer capacitors 118 are arranged in a well balanced manner within the base portion 116 in the casing 112, are electrically connected to the solar cell modules 117 and charged by a output power of the solar cells. Further, the group of electrical double-layer capacitors 118 are also connected to input terminals 119 provided on the outer surface of the base portion 116 of the casing, and can be charged by batteries mounted on the vehicle connected to the input terminal 119. A plurality of light emitting diodes 120 are arranged in a protective cover 121 having a light transmission property placed on the top plate portion 116 of the casing 112. In this case, a horizontal reflecting plate 122 is provided on the lower side of the light emitting diode assembly 120.

Although not shown in the figure, for preventing the portable lighting instrument 111 from being blown off by air pressure from a helicopter when the former is set in a fixed position, suitable position-locking means is preferably provided, such that the entire weight thereof is increased, or the instrument is magnetically locked, for example, or an anchor projecting from the casing is provided and locked by inserting it into the ground.

Figure 2:
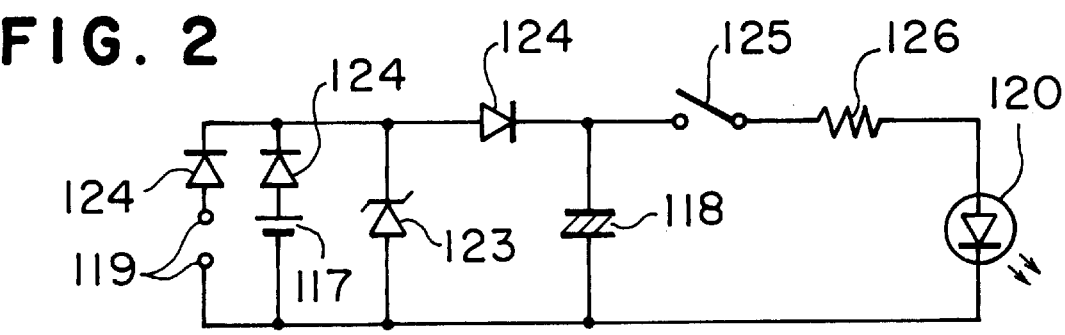
FIG. 2 is a circuit view in principle of the portable lighting instrument shown in FIG. 1.

FIG. 2 is a schematic electric circuit view of the portable lighting instrument 111 according to the present invention, clearly showing an electrical connecting relation of main constituent elements comprising the solar cell 117, the electrical double-layer capacitor 18 charged by the solar cell 117, and the light emitting diode 120 lighted by a power supplied from the electrical double-layer capacitor 118. In this circuit, a Zener diode 123 for protecting the electrical double-layer capacitor 118 from over-voltage and a back-flow preventing diode 124 are disposed. An external input terminal 119 is provided in parallel with the solar cell 117 so that the electrical double-layer capacitor 118 can be rapidly fully charged from the battery mounted on the vehicle through the input terminal 119. It is obvious for those skilled in art to match a voltage to a current in the respective constituent elements to design an actual circuit.

Figure 3:
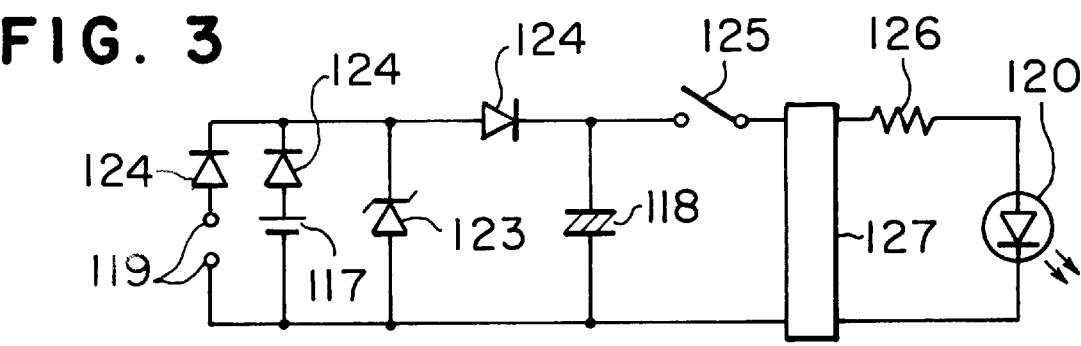
FIG. 3 is a circuit view in principle representative of a modification of FIG. 2 to which a flash (turning on and off) circuit of the light emitting diode assembly is add.

In the case where the portable lighting instrument 111 is formed into the flash (turning one and off) type, a flash (turning on and off) circuit 127 can be added as shown in FIG. 3.

Figure 4:
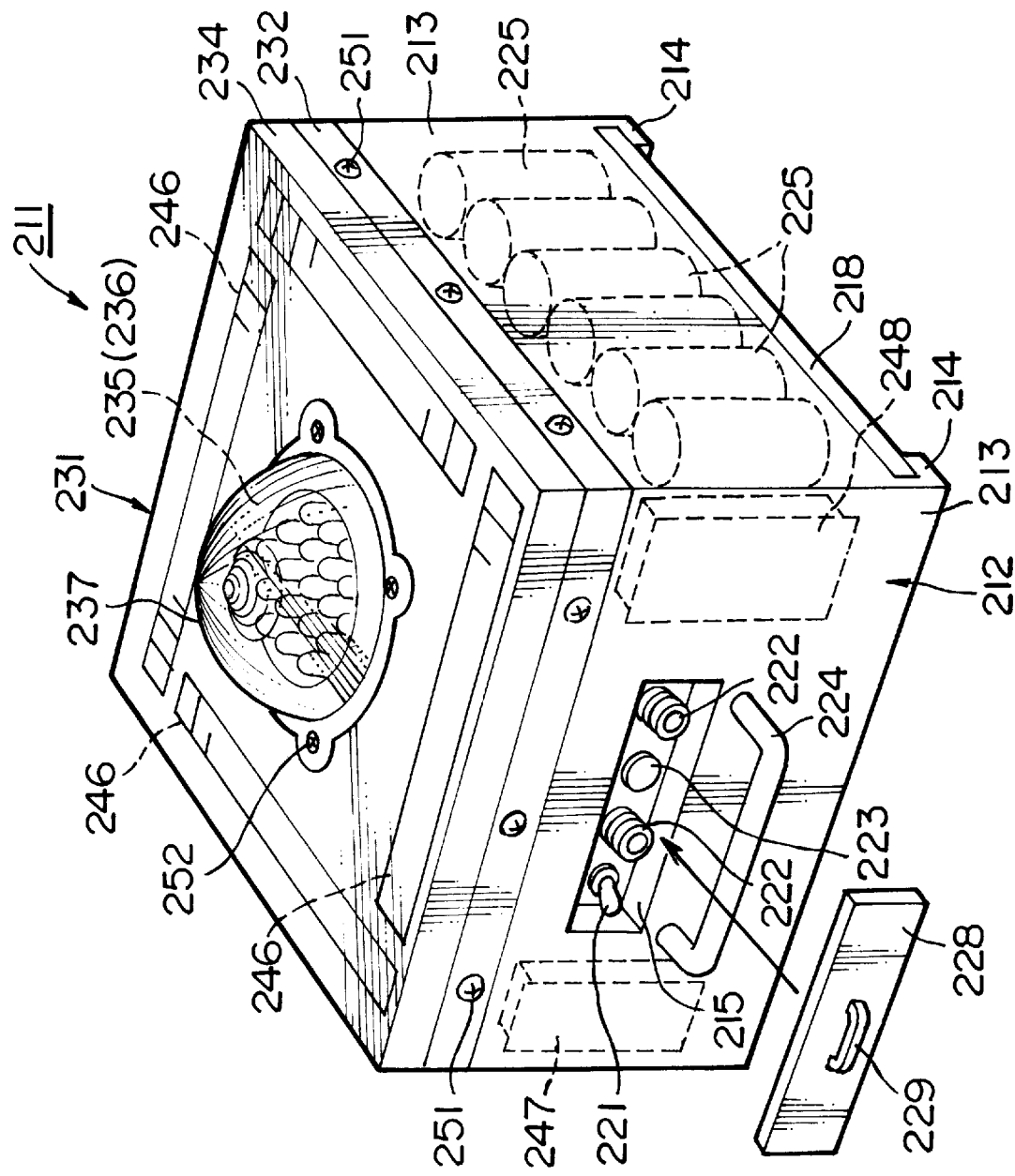
FIG. 4 is a general perspective view showing another example of a portable lighting instrument according to the present invention.
Figure 5:
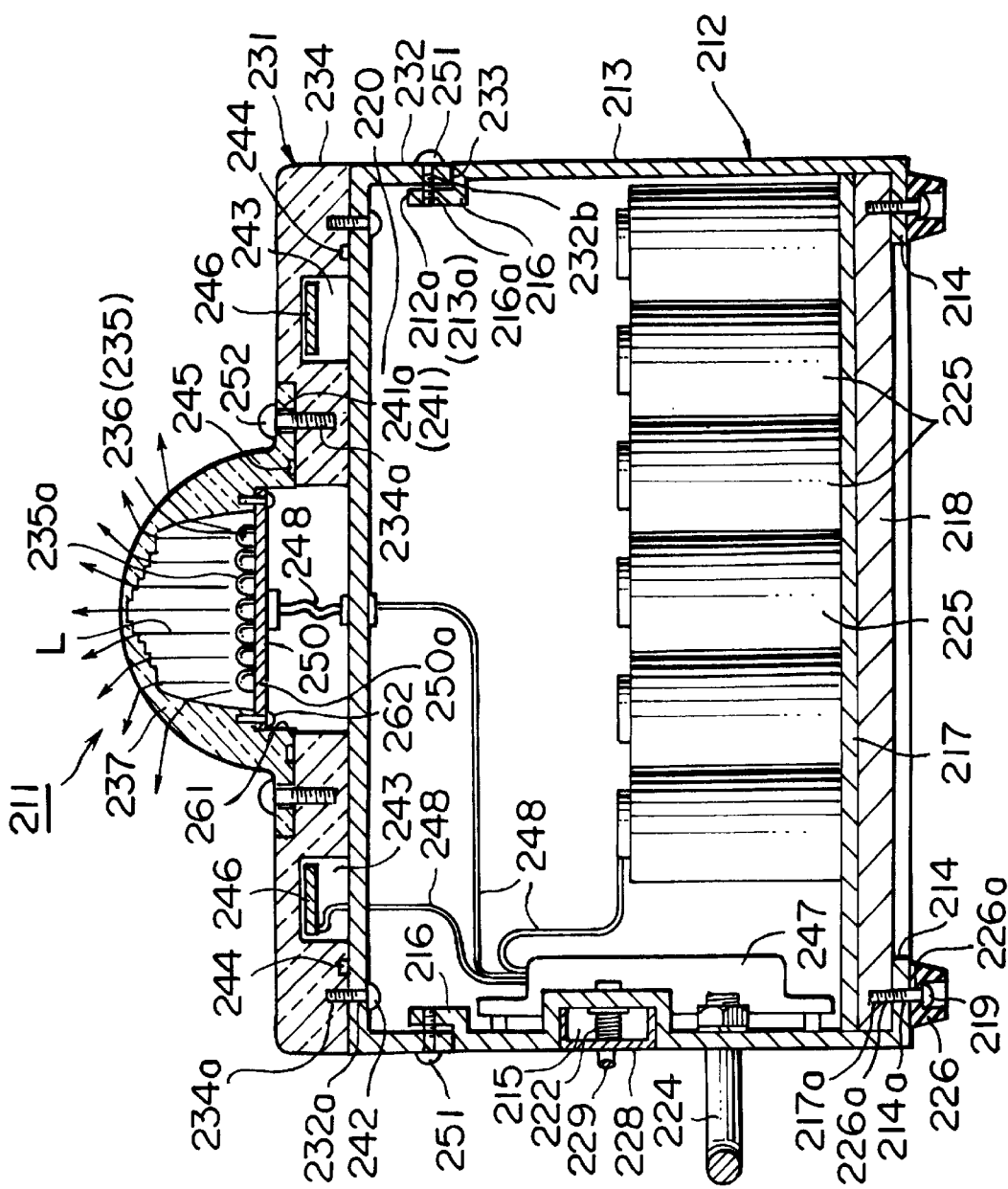
FIG. 5 is a schematic longitudinal sectional view of FIG. 4.

FIG. 4 is a general perspective view showing another example of the portable lighting instrument according to the present invention, and FIG. 5 is a schematic longitudinal sectional view thereof. In these figures, the whole portable lighting instrument 211 comprises a box body 212 having an opening 220 in the upper surface thereof and comprising a plurality of electrical double-layer capacitors 225 disposed capable of being charged and necessary members such as circuit portions 247, 248; a light emitting body 235 formed from a plurality of light emitting diode assemblies 236; and a lid 231 provided with at least a lens body 237 for covering the light emitting body 235 and controlling the diffusion range of irradiation light in a direction of an optical axis to fixedly cover an opening 220 of the box body 212.

The box body 212 is formed of a metal material such as aluminum or stainless steel or a suitable synthesized resin material and in the form of a solid shape such as a cubic body or parallelepiped body having a capacity as required, and a handle 224 used in carrying is mounted on a suitable side plate portion 213. A plurality of electrical double-layer capacitors 223 within the box body 212 are arranged in upright in the number of 36 in total (see FIG. 8) comprising 6 (longitudinal)×6(lateral) of 100 F cylindrical electrical double-layer capacitors 225 whose rated voltage is 2.5 V, for example. In FIG. 5, reference numeral 248 designates a lead wire wired to provide an electrical connection between necessary members, such as a light emitting body 235 and a circuit portion 247. The electrical double-layer capacitors 225 can be disposed with the number thereof increased or decreased as desired. The suitable side plate portion 213 in the box body 212 is provided with a recess (depressed)

portion 215 in which are disposed a switch 221 such as a toggle switch for turning on and off the light emitting body 235, a pair of connecting terminals 222, 222 to which two feed cords drawn out of a battery mounted on an automobile are separately connected, and a check lamp 223 comprising a light emitting diode showing the charging state of the electrical double-layer capacitors 225. The recess portion 215 is preferably designed so that it can be covered, when not in use, by a lid 228 on which a handle 229 is mounted. The box body 212 has holding-piece portions 214, 214 which are separately bent in a face direction of a bottom plate portion 217 somewhat projected from a pair of side plate portions 213, 213 on either one side downward of the bottom plate portion 217 in a opposing positional relation, and a weight plate 218 is arranged between the holding-piece portions 214, 214 and the bottom plate portion 217. The weight plate 218 is detachably mounted on the box body 212 by means of a screw 219 fed into a tapped hole 217a of the bottom plate portion 217 by being passed through a through-hole 218a of the weight plate 21 via a through-hole 226a of a leg portion 226 and a through-hole 214a of the holding-piece portion 214 whereby even if a relatively high air pressure is received, the box body 212 can be set stably. It is to be noted that in the case where a number of electrical double-layer capacitors 225 are arranged within the box body 212, the weight overcoming the air pressure is obtained, and the weight plate 218 can be removed. Further, the leg portion need not be provided. Each side plate portion 213 is formed in its upper edge portion 213a with, that is, the box body 212 is formed in its open edge portion 212a with a receiving portion 216 inwardly bent in substantially L-shape so that the lid body 231 can be placed stably through the receiving portion 216.

The lid body 231 comprises a lid body portion 232 with its lower end 233 placed on the receiving portion 216 to cover an opening 220 of the box body portion 212, a transparent panel portion 234 to cover the upper surface of the lid body portion 232, a light emitting body 235 having one light emitting diode 23 or more provided at a substantially center part of the transparent panel portion 234, a lens body 237 for covering the light emitting body 235 to control the diffusion range of irradiation light in a direction of an optical axis L, and a solar cell 246 installed within the transparent panel portion 234 located on the outer peripheral side of the lens body 237 to freely charge the electrical double-layer capacitors 225. In this case, the lid body portion 232 and the transparent panel portion 234 are integrally fixed by applying airtightness thereto under the suitable fixing construction such that a screw 242 is threadedly mounted from the through-hole 232a provided in the lid body portion 232 to the tapped hole 234a provided in the transparent panel portion 234. The solar cell 246 is installed within the transparent panel portion 234 under the arranging pattern from which a fixed voltage is obtained such that the solar cell 246 is installed in a solar panel fashion within each groove 243 formed internally of the transparent panel portion 234 under the arranging pattern in which the periphery thereof has approximately a square about the light emitting body 235.

The light emitting body 235 is disposed on the transparent panel portion 234 such that a flat light emitting surface 235a is formed on the top surface by a plurality of light emitting diodes 236 provided on a circuit substrate 250, for example, in the dense state in which the respective top ends 236a are stood upright so as to have substantially the same level. In this case, the light emitting body 235 is mounted on the side of the lens body 237 under the suitable fixing construction such that a screw 262 is threadly mounted in a tapped hole 261a provided as shown in FIG. 6(b) described later from a through-hole 250a formed in the circuit substrate 250 to a lower step portion 261 of the lens body 237. The lid body portion 232 has through-holes 232b disposed in plural locations opposed to the receiving portion 216 side when the lower end 233 is placed on the receiving portion 216. A screw 251 is threadly mounted through each through-hole 232b to a tapped hole 216a provide on the side of the receiving portion 216 in a positional relation separately opposed to each through-hole 232b whereby the lid body 231 can be fixedly mounted on the box body 212 and covered.

Figure 6A:
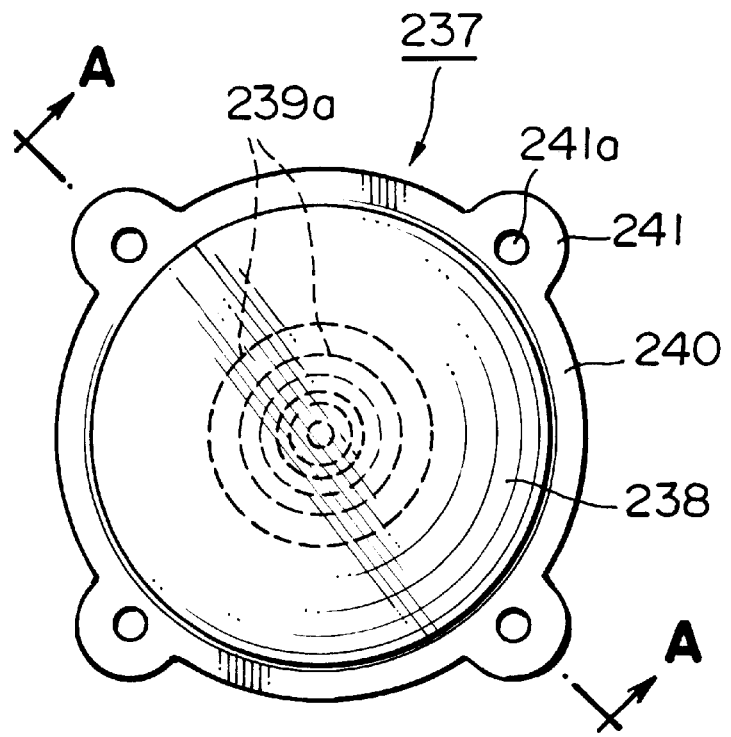
FIG. 6 shows one example of a lens body provided on a lid for the portable lighting instrument shown in FIG. 4, (a) being a plane shape thereof, an (b) being a longitudinal sectional shape in a direction of line A—A in the (a).
Figure 6B:
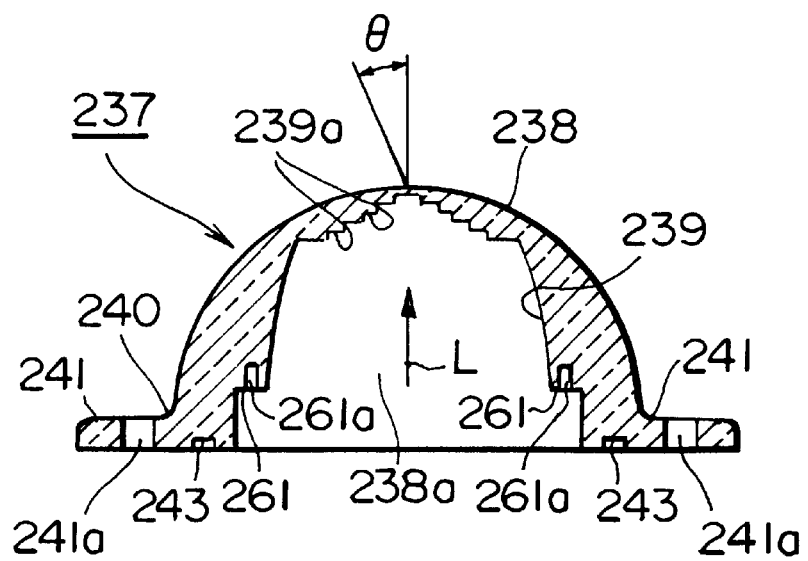

FIG. 6 shows one example of the lens body 237 for covering the light emitting body 235, (a) being a plane shape, and (b) being a longitudinal sectional shape in a direction of line A—A in the (a). As can be seen in these figures, the lens body 237 comprises a lens body portion 238 having a space portion 238a therein to receive the light emitting body 235 and having the surface side inflated in a dome like configuration, a placing portion 240 extended in the outer peripheral edge of the lens body portion 238, and four tongue portions 241 integral with the placing portion 240, being projected from the outer peripheral portion thereof, each tongue portion 241 being provided with a through-hole 241a at a part corresponding thereto for inserting a screw 252 therethrough. The lens body portion 238 is formed with a plurality of peripheral steps 239a for forming a refracted light on an inner peripheral surface 239 at least positioned on the top surface 239 to control the diffusion range of irradiation light in a direction of an optical axis L so as to obtain irradiation light held within the range of an optimal diffusion angle $\Theta$ as desired such that light is diffused so as to be held within the range of about 30 degrees, for example, from the center to the outside in a direction of an optical axis L. The lens body 237 is integrally fixed while covering the light emitting body 235 in a state of being imparted with water-tightness by suitable fixing means such that a screw 252 is threadedly mounted from the through-hole 241a of the tongue portion 241 to the tapped hole 234a of the transparent panel portion 234 with an 0-ring 245 interposed between it and the transparent panel portion 234 placed through the placing portion 240. In FIG. 6 (b), reference numeral 243 designates a groove for the 0-ring 245.

Figure 8:
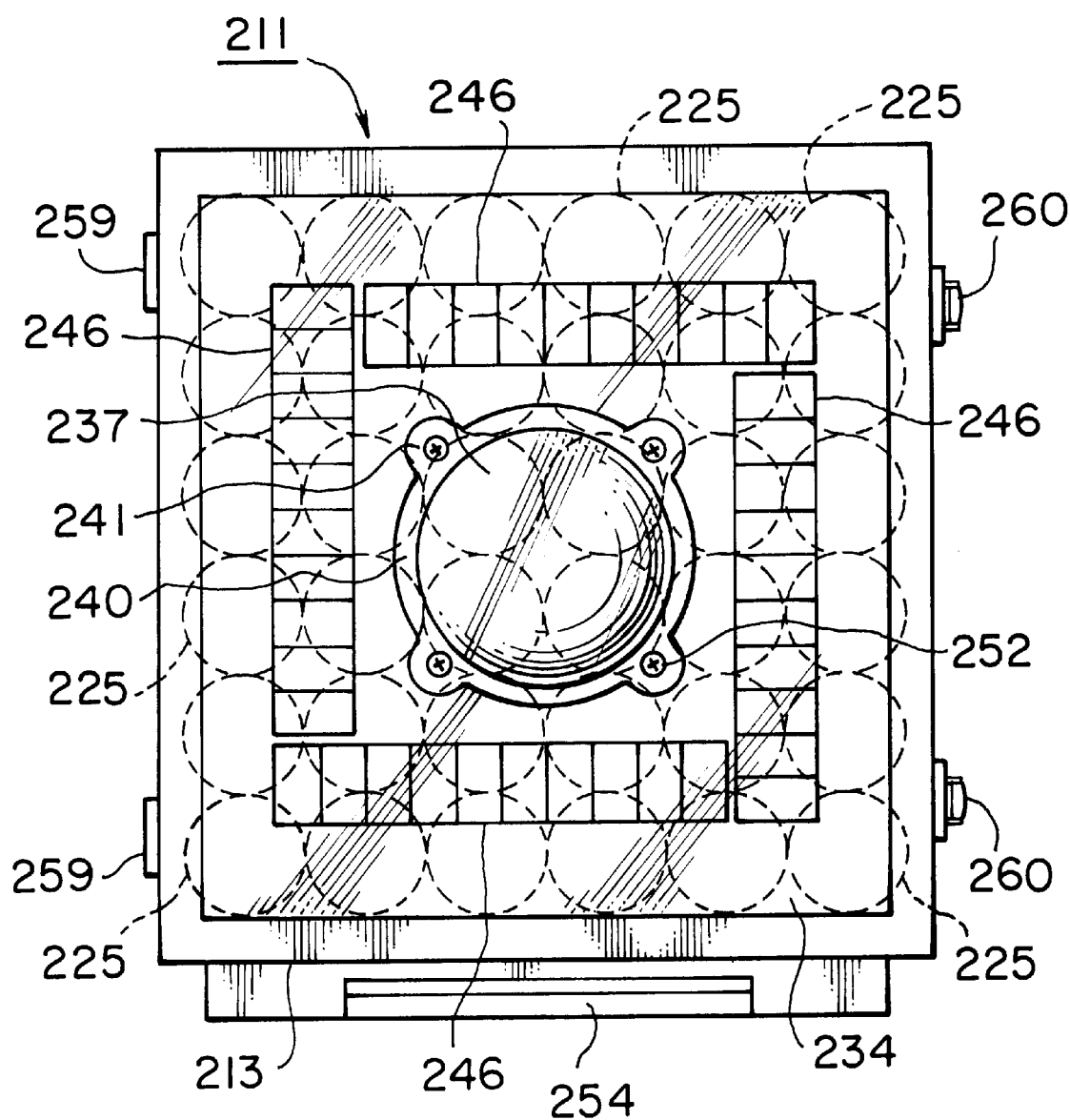
FIG. 8 is a plan view of a modification shown in FIG. 7.

FIG. 7 is a schematic longitudinal sectional view showing a still another embodiment of the portable lighting instrument according to the present invention, and FIG. 8 is a schematic plan view of another example shown in FIG. 7. As can be seen in FIGS. 7 and 8, the whole portable lighting instrument 211 is constituted by a box body 212 having an opening 220 in the upper surface thereof, and at least comprising members such as one electrical double-layer capacitors 225 or more disposed chargeably, a necessary circuit portion 253 and the like, and a lens body 237 for covering the light emitting body 235 to control the diffusion range of irradiation light in a direction of an optical axis, and a lid 231 for closeably covering the opening 220 of the box body portion 212.

The box body 212 is formed of a metal material such as aluminum or stainless steel or a suitable synthesized resin material and in the form of a solid shape such as a cubic body or parallelepiped body having a capacity as required, and a handle 254 used in carrying is mounted on a suitable side plate portion 213. Within the box body 212 are arranged in upright in the number of 36 in total comprising 6 (longitudinal)×6(lateral) of 100 F cylindrical electrical double-layer capacitors 25 whose rated voltage is 2.5 V, for example, as shown in FIG. 8. The electrical double-layer capacitors 25 can be disposed with the number thereof increased or decreased as desired. The opening 220 of the box body 212 is covered by a blind plate 255 for concealing the electrical double-layer capacitors 225, and on the blind plate 255 are disposed suitable necessary members such as a switch 221 such as a toggle switch for turning on and off the light emitting body 235, a check lamp 223 such as LED indicating the charging state of the electric double-layer capacitors 225, and the like. Further, on the lower surface of the blind plate 255 are disposed suitable necessary members such as a circuit portion 253 interposed between the check lamp 223 and the electrical double-layer capacitor 225 connecting a lead wire 248. The upper edge 213a of each side plate portion 213, that is, the open edge 212a of the box body 212 is formed with a receiving plate 256 which is bent internally into a substantially L-shape, and after this, bent somewhat externally so that the lid 231 can be placed stably through the receiving portion 256. The box body 212 has the skirts 257, 257 somewhat projected from a pair of side plate portions 213, 213 on either one side in an opposed positional relation downward of the bottom plate portion 217, and a weight plate 218 is fixedly arranged in a space defined between the skirts 257, 257 and the bottom plate portion 217 whereby the box body 212 can be set stably even if a relatively high air pressure is received. Also in this case, in the case where a number of electrical double-layer capacitors 225 are arranged within the box body 212, a weight overcoming the air pressure, and therefore, the weight plate 218 can be eliminated.

The lid 231 is formed on the proximal end 256 of the receiving portion 256 with a lid body portion 232 for covering the opening 220 of the box body portion 212 in the proximity of the lower end 233, and a blind plate 258 provided on the lower surface side of the lid body portion 232, in addition to the transparent panel portion 234, the light emitting body 235, the lens body 237 and the solar cell 246 disposed similarly to FIG. 4. Further, the lid 231 covers the box body 212 in a stably placed state by coming the blind plate 258 into contact with the terminal 256b of the receiving portion 256 of the box body 212. In this case, the lid 231 is closely mounted on the side of the side plate portion 213 of the box body 212 through a hinge 259, and suitable locking hardware 260 provided with the construction that cannot open easily the lid 231 when covering are provided on the box body 212 and the lid 231.

Figure 9:
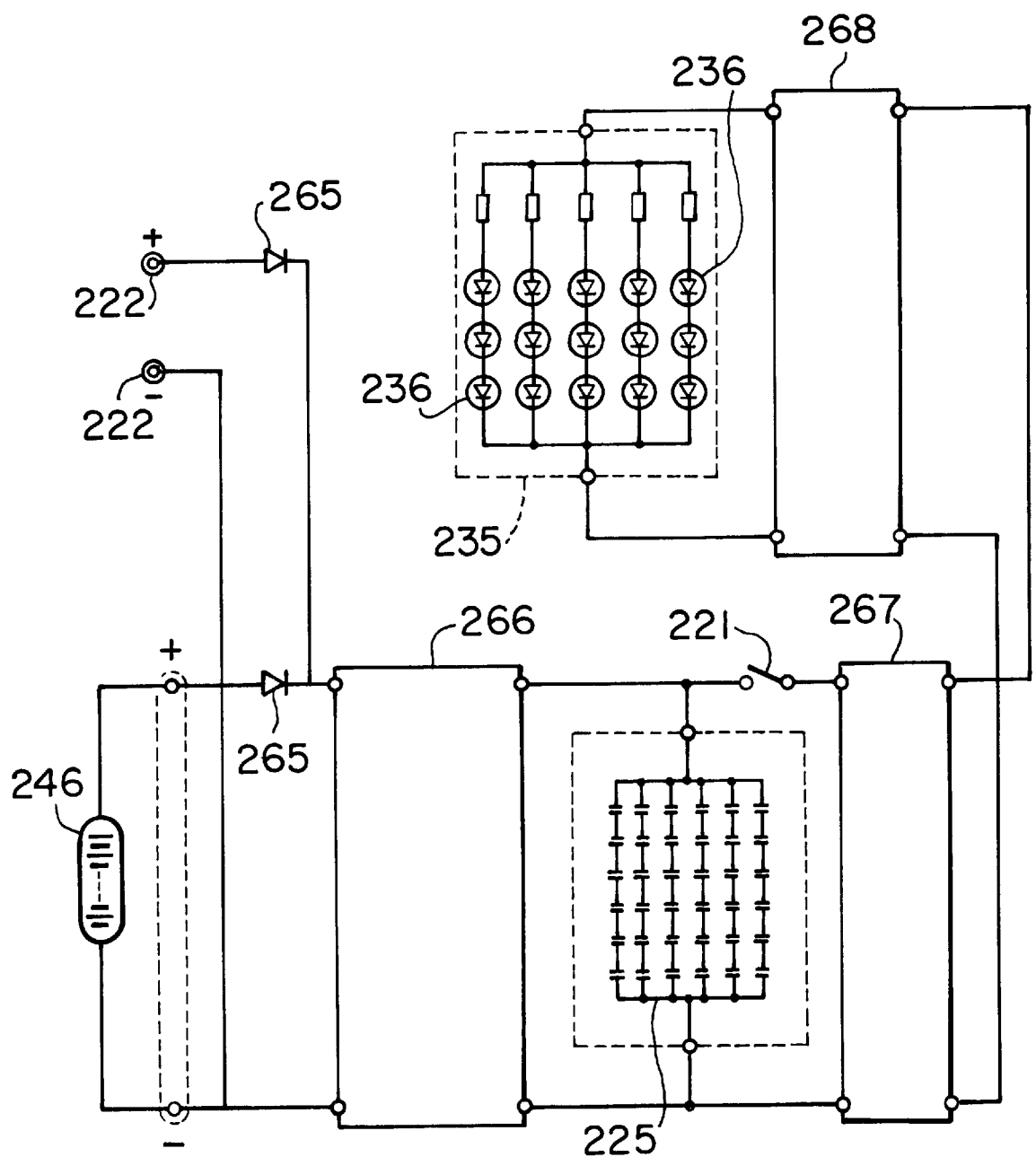
FIG. 9 is an electrical circuit view that can be applied to the embodiments shown in FIGS. 4 and 7.

FIG. 9 is an explanatory view showing a relationship between a circuit portion prepared for controlling the operation of the light emitting body 235 provided on the portable lighting instrument 211, for example, a circuit provided in the circuit portion 247, and the constituent members such as a solar cell 246, an electrical double-layer capacitor 225 and the like. Referring to FIG. 9, between the solar cell 246 as a feeder source, the connecting terminals 222, 222 to which is connected a feeder cord drawn out of a battery mounted on an automobile and the electrical double-layer capacitors 225 is interposed an over-charge protective circuit 266 provided with a check lamp 223 (see FIG. 4) comprising a light emitting diode or the like which is turned on when charging is completed. In this case, in the case where a battery mounted on an automobile is a feeder source, the electrical double-layer capacitors 225 can be fully charged. Between the electrical double-layer capacitors 225 and the light emitting body 235 formed from the light emitting diode 236 are interposed a capacity monitoring circuit 267 for monitoring the quantity of charge of the electrical double-layer capacitors 225 provided with a check lamp (not shown) comprising a light emitting diode which is lighted when fully charged or is lighted when the quantity of charge is short, and a boosting inverter circuit 268 for making high a voltage applied to the light emitting body 235. Between the electrical double-layer capacitors 225 and the capacity monitoring circuit 267, the light emitting body 235 is lighted when the circuit can be opened and closed through the switch 221 and the switch 221 is closed. In FIG. 9, reference numeral 265 designates back-flow preventing diodes separately interposed between the solar cell 246 and the over-charge protective circuit 266, and between the electrical double-layer capacitors 225 and the over-charge protective circuit 266.

Figure 10:
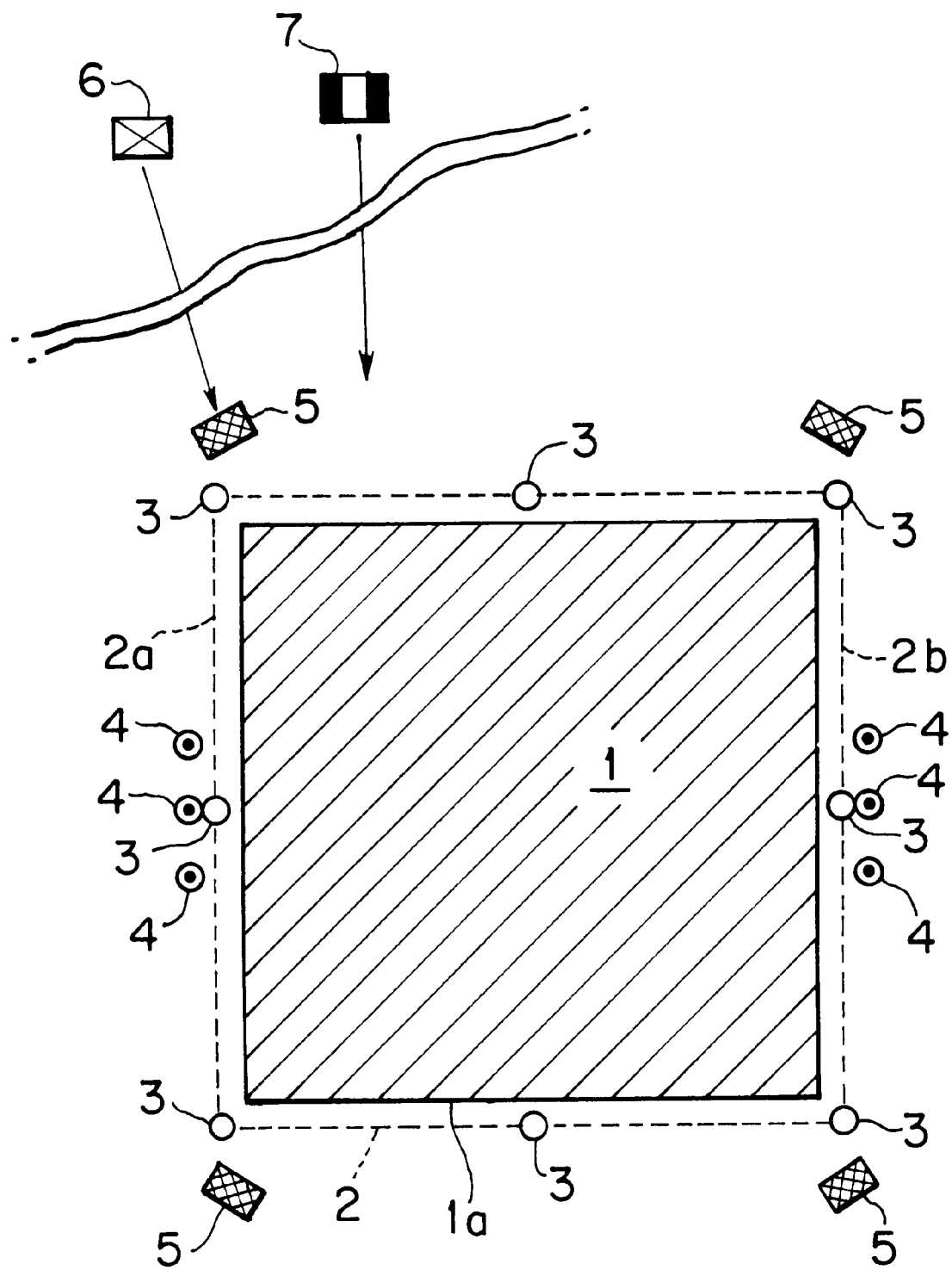
FIG. 10 is an explanatory view showing one example of a lighting system for a helicopter taking off and landing place using the lighting instrument according to the present invention.

FIG. 10 is an explanatory view showing an example in which the lighting instrument according to the present invention is applied to a lighting system for a helicopter taking off and landing place. This example is applied to "a taking off and landing place other than an airport". The lighting system for a helicopter taking off and landing place is constituted by various portable lighting instruments comprising: a landing zone 1 indicated by diagonal lines in which longitudinal side×lateral side: 3 m×13 m, eight boundary lamps 3 installed at four corners of a similar frame broken line 2 positioned externally 0.5 m from the outer edge 1a and in the central portions of the longitudinal sides 2a, 2b, six boundary guide lamps 4 constituted by respectively three arranged externally 0.5 m of the boundary lamps 3 installed in the respectively central portions of the longitudinal sides 2a, 2b in the frame broken line 2 and in upper and lower positions away by 1.5 m, four landing area lighting lamps 5 installed externally 1.0 m from the boundary lamps 3 positioned at four corners of the frame broken line 2, a heliport lighthouse 6 and a wind lamp 7 installed externally 13 m upward of the right-upper corner in the frame broken line 2. In this case, at least a boundary lamp 3 as an immovable light and a boundary guide lamp 4 can be installed using the portable lighting instrument 11 shown in FIG. 1. In the case where the boundary lamp 3 is used, the portable lighting instrument 111 from which white or yellow light emitting color is obtained can be used, and in the case where the boundary guide lamp 4 is used, the portable lighting instrument 111 from which green light emitting color is obtained can be used. With respect to at least either one of the portable lighting instrument 111 out of the wind lamp 7 as an immovable light and the landing area lighting lamp 5, this can be formed by comprising a solar cell 117 disposed on the outer surface of the casing 112, one electrical double-layer capacitor 118 or more charged by the solar cell 117 disposed within the casing 112, one light emitting diode 121 or more lighted by a current separately supplied from the electrical double-layer capacitors 121 disposed on the top of the casing 112, as necessary. With respect to the heliport lighthouse 6 which requires flash (turning on and off), a control circuit provided with the flash (turning on and off) circuit 127 is used as shown in FIG. 3 as described above whereby the light emitting diode 121 can be disposed with flash.

In place of the portable lighting instrument 111 shown in FIG. 1 used for the lighting system for a helicopter taking off and landing place according to the present invention, the portable lighting instrument 211 shown in FIGS. 4 and 7 can be likewise used. Since the portable lighting instrument 111 shown in FIG. 1 is provided with a solar cell 117, electrical double-layer capacitors 118 charged by the solar cell 117, and a light emitting diode 120 lighted by a current supplied form the electrical double-layer capacitors 118, the electrical double-layer capacitors 18 are charged at daylight whereby it can be suitably used as the boundary lamp 3 and the boundary guide lamp 4 in FIG. 10 not requiring a wiring at night. Since the electrical double-layer capacitors 118 incorporated into the portable lighting instrument 111 can store a large energy in a short period of time, and can withstand the use at a practical level for a long period of time, more excellent stability can be imparted to the portable lighting instrument 111. In the case where the casing body 113 constituting the casing 112 has on its respective surfaces the slant plate portions 114 inclined with respect to the horizontal surface and the solar cells 112 are provided on the respective slant plate portions 114, even if altitude of sun is varied with season, photoelectric conversion is made most effectively to obtain an electric energy. In the case where the casing 112 has the connecting terminal 119 for connecting a feeder line drawn out of the battery mounted, also in the case where the portable lighting instrument 111 has to be used unexpectedly, the instrument is fully charged rapidly in a short period of time and thereby can be used.

Since the light emitting body 235 is covered by the lens body 237, a relatively wide range can be lighted while scattering the irradiation light in a direction of an optical axis L. Therefore, it can be suitably used without requiring a wiring as the boundary lamp 3 and the boundary guide lamp 4 in FIG. 10 which are required to be an immovable light, for example, in "an emergency taking off and landing place" and "an emergency rescue space" in the lighting instrument for a helicopter taking off and landing place. Moreover, when the light emitting body 235 is provided with the flat light emitting surfaces 235a, the stabilized irradiation light can be irradiated outside while storing it in compact within the space 238a of the lens body 237.

In the case where the box body 212 is provided on its bottom with the weight plate 218, even if a helicopter should receive high air pressure when the helicopter mobilizes at the time of emergency, for example, at the time of emergency and accidents, it can be set in a fixed position stably. Further, in the case where the weight plate 218 is detachably disposed on the box body 212, the weight plate 28 can be removed for use according to the using object.

In the case where the box body 212 is provided with a pair of connecting terminals 222, 222 capable of separately connecting two feeder cords drawn out of the battery mounted on an automobile, even if the portable lighting substance 211 has to be used unexpectedly, it can be fully charged rapidly in a short period of time for immediate use. Also in the case where the portable lighting instrument 211 is used as the boundary lamp 3 and the boundary guide lamp 4 required when a helicopter which mobilizes at the time of emergency takes off or lands as described above, electrical wiring can be cleared away to execute the installation operation to a fixed position quickly, and in addition, a receiving attitude can be prepared immediately merely by closing the switch 221 to place the light emitting body 235 (light emitting diode 236) in a lighting state without requiring pre-preparing operation such as charging before a helicopter flies. Further, after the use of the instrument, it can be easily withdrawn merely by gripping the handle 224 shown in FIG. 4 or carrying it away while drawing and holding the embedded handle 254 shown in FIG. 8.

In the case where the box body portion 212 and the lid 231 are fixedly mounted by means of the screw 251 as shown in FIG. 4, the lid 231 cannot be removed at random. Therefore, it can be used stably as the all-climate type portable lighting instrument 211 which maintains excellent water-tightness. Further, the lid 231 is closeably mounted on the box body portion 212 as shown in FIG. 7, it can be used stably as the all-climate type portable lighting instrument 211 which maintains excellent water-tightness similar to FIG. 4 through the blind plates 255, 258 attached thereto, and in addition, since the blind plates 255, 258 can be also removed, maintenance operation can be simplified.

With respect to the charging system for the electrical double-layer capacitors 118 and 225 according to the present invention, a joint-use system capable of selectively making use of charging by means of the solar cells 117, 246 and charging from the battery mounted on an automobile is most preferably employed. However, a sole charging system such that charging can be made merely by the solar cells 117, 246 or charging can be made merely from the battery mounted can be employed as desired.

According to the lighting system for a helicopter taking off and landing place in accordance with the present invention, the portable lighting instrument 111 shown in FIG. 1 can be used at least as the boundary lamp 3 and the boundary guide lamp 4. Therefore, for example, the electrical wiring can be cleared away from the periphery of the landing zone 1 shown in FIG. 10 to execute the installation operation to a fixed position quickly, and in addition, a receiving attitude can be prepared immediately merely by closing the switch 125 to place the light emitting diode 121 in a lighting state without requiring the pre-preparation operation such as charging before the helicopter flies. After the use as "an emergency taking off and landing place" or "an emergency rescue space" for a helicopter, the withdrawing operation can be executed very simply merely by recovering the portable lighting instrument 111. In the case where the portable lighting instrument 111 is formed in which a plurality of electrical double-layer capacitors 118 are encased in the casing 112 and a plurality of light emitting diodes 121 lighted by a current supplied separately from the electrical double-layer capacitors 118 are disposed to obtain brightness fulfilled with luminous intensity required for the wind lamp 7 or the landing area lighting lamp 5, the portable lighting instrument 111 is used as the heliport lighthouse 6, the wind lamp 7 and the landing area lighting lamp 5 whereby the electrical wiring can be cleared away over the wider area, to thereby execute adjustment of a receiving attitude including installations and withdrawal after use more quickly.

According to the portable lighting instrument 211 shown in FIGS. 4 and 7, there is provided the light emitting body 235 comprising one light emitting diode 236 or more lighted by a current supplied from the electrical double-layer capacitors 225 charged by he solar cell. 246 and the battery mounted on an automobile. Therefore, the electrical double-layer capacitors 225 are charged during daytime, and the instrument can be used as a general-use type lighting instrument when one enjoys, for example, an outdoor life.

What is claimed is:
1. A portable lighting instrument comprising:
 a. a casing having a bottom wall, side walls, and a top wall;
 b. a solar module including a number of solar cells which form an outer surface of said casing;
 c. an external power source terminal provided on said casing to receive a power from external power source through said terminal;
 d. at least one electrical double-layer capacitor arranged within said casing;
 e. means for selectively connecting said electrical double-layer capacitor to said solar cell module and said external power source terminal;

f. a light source including a light emitting diode assembly provided on the top wall of said housing, said light emitting diode assembly being driven by power output from said electrical double-layer capacitor; and g. switch means for turning on and off said light source.

2. The lighting instrument according to claim 1, wherein said external power source comprises a battery mounted on an automobile.

3. A portable lighting instrument comprising:

a. a casing having a bottom wall, side walls, and a top wall;

b. at least one electrical double-layer capacitor arranged within said casing;

c. a light source including a light emitting diode assembly provided on the top wall of said housing, said light emitting diode assembly being driven by power output from said electrical double-layer capacitor;

d. means for charging said electrical double-layer capacitor; and e. switch means for turning on and off said light source.

4. The lighting instrument according to claim 3, wherein said charging means comprises a solar module including a number of solar cells which form an outer surface of said casing.

5. The lighting instrument according to claim 4, wherein said casing has side walls forming the outer surface inclined between the small-area top wall and the large-area bottom wall, said solar module being arranged on said inclined outer surface.

6. The lighting instrument according to claim 3, wherein said charging means include a power source terminal provided on said casing to receive power from the external power source through said terminal.

7. The lighting instrument according to claim 6, wherein said external power source comprises a battery mounted on an automobile.

8. The lighting instrument according to claim 3, wherein said light source includes a reflecting plate for diffusing and irradiating light from said light emitting diode assembly.

9. A portable lighting instrument comprising: a casing; a solar cell disposed on the outer surface of said casing; an electrical double-layer capacitor encased in said casing and charged by said solar cell; and a light source including a light emitting diode assembly lighted by a current supplied from said electrical double-layer capacitor.

10. The lighting instrument according to claim 9, wherein said casing has a connecting terminal for connecting a feeder line drawn out of a battery mounted on an automobile, said electrical double-layer capacitor being charged through said connecting terminal.

11. The lighting instrument according to claim 9, wherein said light source further comprises a lens body for covering said light emitting diode assembly to control the diffusion range of irradiation light in a direction of an optical axis.

12. The lighting instrument according to claim 9, wherein said light emitting diode assembly has a flat light emitting surface in which the top end of each light emitting diode has substantially the same height.

13. A lighting system for a helicopter taking off and landing place constructed by various kinds of lighting instruments including a heliport lighthouse, a wind lamp, a landing area lighting lamp, a boundary guide lamp, and a boundary lamp installed in a fixed position of a helicopter taking off and landing place, at least said boundary guide lamp and said boundary lamp being constituted by a portable lighting instrument, said portable lighting instrument comprising a casing, a solar cell module disposed on the outer surface of said casing, an electrical double-layer capacitor encased in said casing and charged by said solar cell, and a light emitting diode assembly disposed on the top of said casing and lighted by a current supplied from said electrical double-layer capacitor.

14. A lighting system for a helicopter taking off and landing Place constructed by various kinds of lighting instruments including a heliport lighthouse, a wind lamp, a landing area lighting lamp, a boundary guide lamp, and a boundary lamp installed in a fixed position of a helicopter taking off and landing place, said wind lamp and said landing area lighting lamp being constituted by a portable lighting instrument, said portable lighting instrument comprising a casing, a solar cell module disposed on the outer surface of said casing, an electrical double-layer capacitor encased in said casing and charged by said solar cell, and a light emitting diode assembly disposed on the top of said casing and lighted by a current supplied from said electrical double-layer capacitor.

15. A lighting system for a helicopter taking off and landing place constructed by various kinds of lighting instruments including a heliport lighthouse, a wind lamp, a landing area lighting lamp, a boundary guide lamp, and a boundary lamp installed in a fixed position of a helicopter taking off and landing place, said heliport lighthouse being constituted by a portable lighting instrument, said portable lighting instrument comprising a casing, a solar cell module disposed on the outer surface of said casing, an electrical double-layer capacitor encased in said casing and charged by said solar cell, and a light emitting diode assembly disposed on the top of said casing and lighted by a current supplied from said electrical double-layer capacitor.

16. The lighting system for a helicopter taking off and landing place according to claim 13, 14 or 15, wherein said casing is provided on each surface thereof with a slant plate portion inclined with respect to a horizontal surface and formed by a casing body portion having a top plate portion on the top thereof and in the form of a frustum pyramid, and a base bottom disposed on the lower side of said casing body portion, said solar cell module being arranged on each slant plate portion, said light emitting diode assembly being disposed on said top plate portion.

17. The lighting system for a helicopter taking off and landing place according to claim 13, 14 or 15, wherein said casing has a connecting terminal for connecting a feeder line drawn out of a battery mounted on an automobile, said electrical double-layer capacitor being charged through said connecting terminal.

* * * * *